Patented Aug. 26, 1947

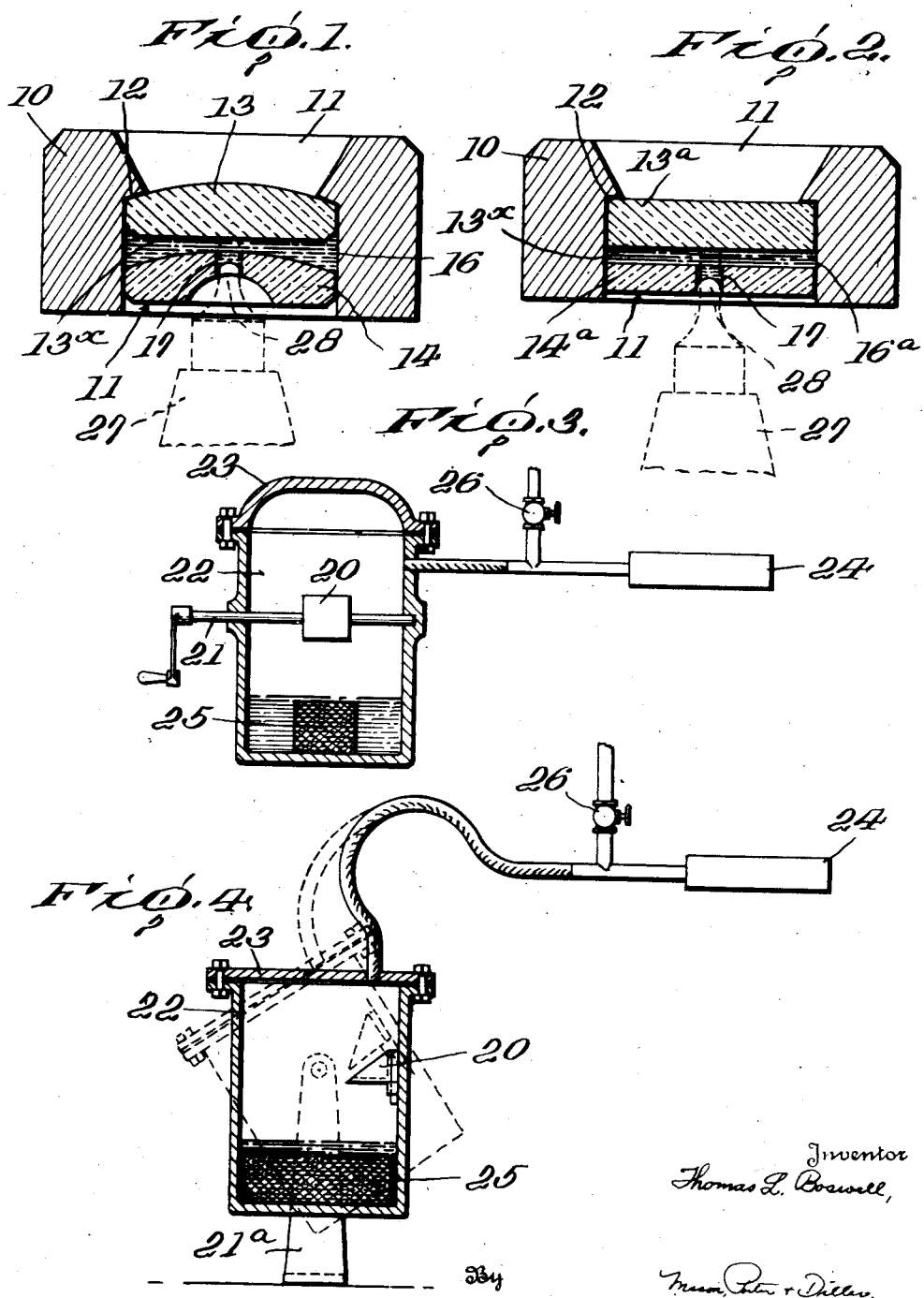

2,426,546

UNITED STATES PATENT OFFICE 2,426,546

ART OF MAKING JEWEL BEARINGS

Thomas L. Boswell, Elgin, Ill., assignor to Elgin National Watch Company, Elgin, Ill., a corporation of Illinois Application January 12, 1944, Serial No. 518,018

1 Claim. (Cl. 308—1)

In watches and fine instruments, it is the practice to employ so-called jewel bearings which by reason of their great hardness and low coefficient of friction at bearing surfaces, contribute greatly to the precision of such mechanisms. In practice, as the mechanical construction has reached higher and higher degrees of precision, the varying levels of friction opposed to the movement of the various parts have established a major factor in determining the inaccuracy of particular instruments. Lubrication of such bearings is therefore employed, for reducing the maximum frictional effect and for maintaining the friction level as nearly constant as possible.

It has been the practice to employ a lubricant at the pivots, to assure maintenance of the friction level; and lubrication at regular intervals of from six months to one year has been recommended for watches. Longer periods may be employed with instruments which have a power supply large enough to hide the effect of faulty lubrication.

Lubricants have recently been developed which do not deteriorate with age over considerable periods of time, do not readily spread or creep away from the pivots, and do not cause corrosion of the steel pivots or brass bushings when employed in jewel bearings. Hence, the difficulties occasioned by thickening of a lubricant no longer occur, and it is unnecessary to periodically wash out the old thickened lubricant or to replace lubricant which has evaporated.

It has also been the practice to shape bearing parts, e. g. balance jewels, so that they are in such relationship to one another that capillary attraction serves to hold the lubricant in proper position. On account of the limited size of the parts which can be employed in watches, particularly wrist watches, the quantity of oil which can be placed in a jewel bearing at any one time is highly restricted. The quantity of lubricant which can be introduced is essentially defined by the capillary attraction, and there is always an air chamber around the body of lubricant. Hence, a drop in barometric pressure or a change of temperature, such as may occur after a cold wrist watch is covered by a coat or glove, causes expansion of the trapped air so that pressure is exerted upon the lubricant, which causes a displacement of the oil outwardly through the pivot hole. Thus, lubricant is lost from the charge which has been provided, and in cases of drastic change of relative pressures, the trapped air may partly escape from the bearing assembly. Upon a subsequent change from low to high barometric pressure, or from a warm to a cold temperature, the reverse action occurs and the lubricant is forced inward away from the bearing surfaces to the extent that capillarity is no longer able to maintain the bearing surfaces in lubricated condition.

According to the present invention, a bearing is provided which contains a supply of lubricant and avoids the foregoing difficulty of pressure-created expulsion from the zone of the bearing surfaces.

Further, in previous constructions of jewel bearings it has been necessary to provide the highest obtainable polish on all surfaces which may come into contact with the lubricating oil, whereas with the present invention it is unnecessary to have more than the actual bearing areas maintained at such high finishes, and other portions of the jewel bearings may be left essentially in the rough or semi-ground condition except as smoothing may be accomplished for the sake of appearance.

An illustrative form of practicing the invention is shown in the accompanying drawings, in which:

Figure 1 is a transverse section, on a radial plane, through a jewel bearing of an end stone type which has been greatly enlarged for clearness.

Figure 2 is a corresponding view of a modified form of the construction.

Figures 3 and 4 illustrate filling apparatus.

In these drawings, a setting bushing 10, which usually is of brass, is provided with a concentric aperture 11 having a flange 12 providing an internal annular shoulder against which is fitted the endstone 13. For security and accuracy, the endstone 13 is closely calibrated in diameter to and has a light driving fit in the bore of the aperture 11 so that an air-tight joint is formed, the tightness of this joint being assured, if so desired, by an application of a thin coating of a sealing cement.

A holestone 14 is also introduced to the aperture 11, and likewise has a light draving fit in the bushing 10 so that an air-tight seal is provided at the periphery, which likewise may be assured by a cement.

In assembling the parts of the structure of Figure 1, it is preferred to accurately gauge the three elements 10, 13 and 14, and force them together successively by press means, introducing the holestone 14 for a sufficient distance so that a space 16 is formed between the inner convex face of the holestone 14 and the opposed planar surface of the endstone 13. When so forced together, the driving fits assure continuity of the assembly.

This assembly is then completed as a unit, either as provided by the parts 10, 13, 14, or after the bushing has been introduced into a watch plate, by filling the space 16 within the aperture 11 and bounded by the stones 13, 14, with a charge of lubricant. This can be expeditiously done by subjecting the bearing to evacuation and then relieving the vacuum by the liquid lubricant. For example, the bearing assembly can be placed (Fig. 3) in a vessel 20 mounted on a rotatable shaft 21 and within the vacuum chamber 22. The chamber is then sealed by its cover 23 and vacuum pump 24 is operated to withdraw as much air as possible from the interior of the chamber. The shaft 21 is then actuated so that the assembly, or a group of assemblies, contained in the vessel 20 are dropped into the container 25 of lubricating oil. The pump 24 is then stopped and valve 26 opened, so that atmospheric pressure enters and relieves the vacuum in chamber 22 and serves to force the oil into the lateral lubricant chamber 16 for filling the same.

The assemblies are then removed from the container 25, the external surfaces are wiped clean, and the bearings are ready for use. In this condition, it will be noted in Figs. 1 and 2 that the lubricant also occupies at least a part of the pivot hole itself. They can be stored and transported without difficulty, and can be used for new devices or for replacement of broken jewel bearings.

This setting bushing can be forced into or otherwise introduced or held in an instrument plate by any of the normal means. In employment, the moving element 27 is positioned with its pivot staff end 28 within the hole 17 in the usual way.

In the modified form of Fig. 2, the bushing 10 has the aperture 11 as before and is provided with the flange 12 having a shoulder for receiving the endstone 13a which in this construction is a simple cylindrical disk. The holestone 14a is likewise a simple cylindrical disk having the concentric hole 17 therein. Thus, the cost of producing the jewel elements may be greatly reduced. These parts can be assembeld in the manner described above and the space 16a filled with lubricating oil by the same procedure.

In each instance, it is only necessary to have the surface 13x of the endstone and the internal surface of the hole 17 finished to a high degree of polish.

The bearing members or stones can be formed of any appropriate material. It is presently customary to form them of natural or synthetic ruby or spinel, or of glass or hard metal, so that in general the stone is of a hard non-porous substance which is formed accurately to shape and size and thereby capable of presenting a guiding and supporting surface which resists wear for a long time.

In each instance, the bearing assembly comprises the hard, impervious bearing members which are separated to provide a lubricant space extending laterally or radially away from the bearing zone to provide an oil chamber which is sealed from the atmosphere except at the annulus around the pivot or staff member which is present while the bearing is in service. The entire chamber is filled with the lubricant, thus assuring the elimination of any pocket of trapped air which by expanding and contracting might cause a displacement of the oil outwardly or inwardly through the pivot hole, thus insuring a long-enduring lubrication.

With such an arrangement, due to the absence of air in the chamber, the lubricating oil is not forced through the pivot hole in response to changes of the ambient atmospheric pressure or to as marked an extent by changes in temperature, and the atmospheric pressure itself acts to maintain lubricating oil within the bearing assembly.

As a specific example of practice for a watch jewel assembly for an 8/0 size balance, the outer diameter of the setting bushing is 0.056 inch, with a thickness of 0.029 inch. The two stones of Fig. 1 are pressed together until the space at the edge of the hole in the holestone 14 is approximately 0.001 inch. The staff end 28 has a 0.0004 inch clearance (on diameter) in the holestone.

A modified apparatus for effecting the filling of the bearing structure is shown in Fig. 4, in which the vacuum chamber 22 and its sealing cover 23 are mounted for rocking about a horizontal axis provided by pivotal mounting on 21a. The assembly, or a group of assemblies, placed upon a removable support 20 carried on the wall of the chamber 22, is subjected to evacuation by the vacuum pump 24, in common with the contents of the chamber. A basket 25 of netting or other porous material is positioned upon the floor of the chamber, and a quantity of lubricating liquid is provided in the chamber adequate to cover the assemblies. After evacuation has proceeded, the chamber 22 is tilted until the assemblies slide from the support 20 into the basket 25 and thus into the lubricant. The pump 24 is stopped, and relief valve 26 opened, wherewith atmospheric pressure is established upon the lubricant, which enters the aforesaid spaces in the assemblies. The cover is removed, and the basket 25 is lifted for draining and then removed. Its contents of assemblies are wiped on their outer surfaces, and these assemblies are ready for use.

It is obvious that the invention is not limited only to the forms of practice described, but that the same may be employed in many ways within the scope of the appended claim.

Having thus described the invention, what is claimed as new and desired to be secured by Letters Patent is:

The method of forming a lubricated jewel bearing assembly having a sealed lubricating chamber radially outside the bearing zone, which consists of evacuating gases from said chamber and then relieving the vacuum therein by a liquid lubricant material, whereby the lubricant thereafter is subjected to gas pressure only at its exposed area at the bearing zone.

THOMAS L. BOSWELL.

REFERENCES CITED

The following references are of record in the file of this patent:

UNITED STATES PATENTS

| Number | Name | Date |
|---|---|---|
| 1,729,542 | Erismann-Schinz | Sept. 24, 1929 |
| 2,229,428 | Thebaud | Jan. 21, 1941 |
| 1,371,022 | Ecaubert | Mar. 8, 1921 |
| 2,030,504 | Davis | Feb. 11, 1936 |

FOREIGN PATENTS

| Number | Country | Date |
|---|---|---|
| 124,562 | Switzerland | Mar. 1, 1928 |
| 129,633 | Switzerland | Jan. 2, 1929 |
| 167,229 | Switzerland | May 1, 1934 |